United States Patent Office

3,822,331
Patented July 2, 1974

---

3,822,331
CONTINUOUS PROCESS FOR MAKING LOW DENSITY THERMOPLASTIC FOAM
Joseph A. Cogliano, Baltimore, Md., assignor to W. R. Grace & Co., New York, N.Y.
Filed Dec. 10, 1971, Ser. No. 206,612
Int. Cl. B29d 27/00
U.S. Cl. 264—51                              7 Claims

ABSTRACT OF THE DISCLOSURE

The present invention is directed to a continuous process foar making highly expanded foam thermoplastic material including the step of extruding a foamable thermoplastic composition into a zone at subatmospheric pressure. Apparatus suitable for effecting said proccess comprising an extruder and a chamber having vacuum means associated therewith is also disclosed. The chamber communicates with the extruder for expanding a thermoplastic extrudate to low density foam under subatmospheric pressure.

---

The present invention relates to an improved process for making highly expanded foam thermoplastic material including the step of extruding a foamable thermoplastic composition into a subatmospheric pressure zone. Apparatus adapted for carrying out the process is also provided.

Numerous methods are available to the art for making foamed thermoplastic materials by extrusion through a die of mixture of thermoplastic polymeric materials with foaming agents. Considerable attention has been directed to producing foamed thermoplastic polymeric material such as foamed polystyrene in highly expanded foam. A number of methods are available to the art for producing expandable polystyrene particles. Conventional polystyrene nibs or beads may be steeped in liquid organic foaming agent such as pentane resulting in swelled expandable particles. Expandable polystyrene may be prepared by polymerizing styrene in a volatile liquid organic medium such as pentane. Generally, the prior art methods for producing highly expanded thermoplastic polymeric materials such as lower density foamed polystyrene have not been entirely satisfactory for reasons including complexity, inefficiency and others. It has now been found by practice of the present invention that highly expanded foam thermoplastic polymers are prepared in simple and economical manner. Lower density cellular polymeric foam may thus be prepared with more efficient use of foaming agent in accordance with this invention.

While the present invention is highly suitable for preparing low density expanded polystyrene, foam compositions of other foamable thermoplastic polymers may also be prepared in accordance with this invention.

Generally stated, the present invention provides an improved process for continuously producing highly expanded foam thermoplastic material wherein a molten extrudable polymeric composition comprising a foaming agent uniformly dispersed in expandable thermoplastic polymer is continuously extruded from a zone wherein the composition is under sufficient pressure to substantially prevent foaming into a subatmospheric pressure zone. Low density cellular polymeric foam, i.e., highly expanded foam thermoplastic material, having good cell-size uniformity may thus be produced in efficient manner in a preferred embodiment of the present process which includes continuously feeding into a screw extruder having an outlet die ingredients including a foamable, thermoplastic polymer, which may be a foamable polyolefin of alpha olefinic monomer having preferably from 2 to about 8 carbon atoms per molecule, and a foaming agent, which may be a volatile liquid organic foaming agent having an atmospheric boiling point below the polymer melting point or range; heating the feed ingredients in the extruder to form a melt; rotating the extruder screw at sufficient speed, generally from about 0.5 to about 50 revolutions per minute to uniformly admix the polymer and the foaming agent and pressure the melt to sufficient pressure, generally from about 1500 to about 2500 pounds per square inch to maintain the melt in substantially non-foamed state; and continuously extruding the melt through the die into a zone which is maintained at subatmospheric pressure which may be, for example, in the range from about 2 to about 700 millimeters of mercury absolute (mm. Hg abs.) and preferably from about 2 to about 400 mm. Hg abs., thereby expanding or foaming the polymer to low density cellular polymeric foam. Typically, expansion is accompanied by sufficient cooling such that the expanded polymeric foam is found to solidify, i.e. become relatively dimensionally stable.

The foaming agent may be fed into the extruder as a component of the polymer feed, introduced into the melt through an opening provided in the extruder shell, or fed by way of any other suitable addition means which permits dispersion of the foaming agent substantially uniformly throughout the melt being extruded.

The invention also provides improved apparatus for carrying out the present process. In general, the apparatus includes a screw extruder having an inlet near one end and a die or orifice in the opposite end; a chamber in communication with the extruder through the orifice for receiving extrudate from extruder and having means for applying vacuum to the inside of the chamber; means for continuously feeding a foamable thermoplastic polymer into the extruder inlet; means for introducing a foaming agent into the extruder; means for heating the polymeric mass while in the extruder to form a melt; and power means for rotating the screw to uniformly admix the polymer and the foaming agent, pressure the melt to a pressure sufficient to maintain the melt in substantially non-foamed state, and continuously extrude the heated and pressured melt through the orifice into the chamber while maintaining the chamber at subatmospheric pressure, whereby the extrudate foams to continuously form low-density expanded thermoplastic polymer.

Practice of the present invention will become more apparent from the following detailed description taken in connection with the accompanying drawings wherein like numerals refer to similar elements throughout the several views.

Figure 1:
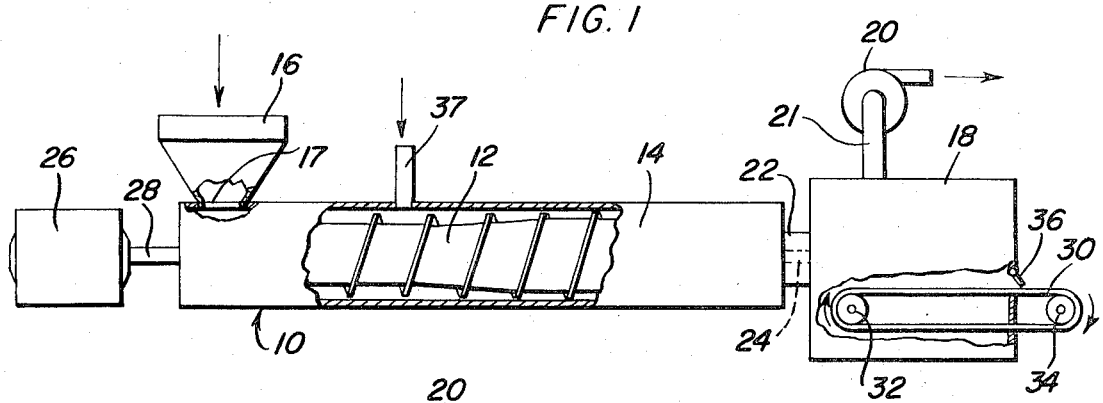
FIG. 1 is an elevation view of a screw extruder in assembly with a subatmospheric pressure chamber, generally illustrating the present invention.

FIG. 1 generally illustrates the present invention which includes screw extruder 10 having screw 12 mounted rotatably within barrel 14 which is provided with hopper 16 above inlet 17 for continuously feeding a foamable thermoplastic polymeric composition into the extruder. Heating and cooling means (not shown) are provided along barrel 14 for controlling the temperature of material advancing through the extruder. Chamber 18 having means 20 for applying vacuum through suction line 21 to the chamber cavity is connected to barrel 14 by die 22 provided with passage 24 for continuously discharging foamable extrudate into the chamber. The extruder 10 is provided with motor 26 having suitable sealed drive shaft 28 through an end of barrel 14 and operably connected with screw 12 for axially rotating the screw. Chamber 18 may be provided with endless belt 30 carried by rollers 32 and 34, one of which is driven by means (not shown) for continuously advancing expanded polymeric composition to a collection station. Flexible gate 36 adapted at its free end to conform to the shape of the polymeric foam being produced may be pivotally mounted on the chamber wall for sealing the evacuated chamber from the surrounding atmosphere, thereby minimizing the load on the vacuum system. The extruder may be provided with conduit 37 for introducing various additives, as may be desired, to thermoplastic composition during its advance through the extruder.

In operation of the apparatus, a foamable thermoplastic composition which may be a flowable mass of foamable polymeric particles is continuously fed through hopper 16 and inlet 17 into barrel 14 while screw 12 is rotated, thereby advancing the polymeric composition through the barrel and at the same time developing substantial pressure. Generally, the work performed by the rotating screw is sufficient to heat the polymer to above its melting temperature, i.e. the energy of rotation operates to melt the polymer. However, it may be necessary to initially heat the barrel and polymer using other heating means such as high pressure steam applied to the outside of the barrel. A foaming agent may be included as a component of the polymeric composition being fed into the extruder or subsequently added thereto by way of conduit 37 which preferably is connected to the extruder at a sufficient distance along the barrel such that addition may be made to molten composition. The screw is rotated at a sufficient speed to uniformly mix the polymer, foaming agent and such other ingredients as may be desired and develop sufficient pressure so that the melt is maintained in a substantially non-foamed state. Where a liquid foaming agent is added, the foaming agent remains essentially liquid and disperses uniformly throughout the melt. Vacuum is applied through suction line 21 to chamber 18 into which polymeric melt at high temperature and under high pressure is continuously passed through orifice 24. The rate of evacuation through line 21 is adjusted such that the absolute pressure in the chamber near the orifice is from about 2 to about 700 millimeters of mercury (mm. Hg) and preferably from about 2 to about 400 mm. Hg.

Lower density foam materials having a variety of shapes may be continuously produced in accordance with the present invention using appropriate dies as will be apparent to those skilled in the art.

Figure 2:
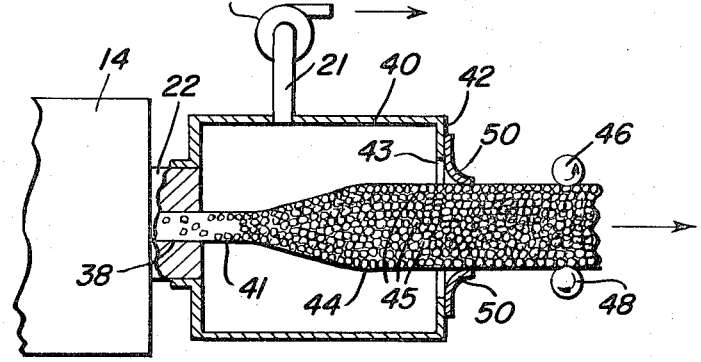
FIG. 2 is a partial side view of an embodiment of the present apparatus, partly in section, illustrating continuous production of a foam rod in accordance with this invention.

FIG. 2 illustrates embodiments of the present process and apparatus for continuously producing an endless foamed polymeric rod. Extrudable polymeric composition is melted and pressured in extruder 14 substantially in the manner described above and continuously extruded through generally cylindrical opening 38 in die 22 into chamber 40 which is connected in sealed relation to the die. The chamber has means illustrated by vacuum pump 20 with suction line 21 for applying vacuum to the chamber cavity wherein the extrudate foams and expands, continuously forming low-density polymeric foam rod 44 which may be characterized with substantially uniform size cells 45. The chamber is provided with discharge end 42 having opening 43 through which the endless polymer foam rod 44 may be advanced as by rolls 46 and 48. The chamber includes flexible flap 50 secured and sealed at one end to the chamber discharge end 42 and extends radially inwardly, the free end of the flap contacting the advancing rod entirely about the rod circumference for sealing the chamber cavity, thereby minimizing the load on the vacuum system.

Figure 3:
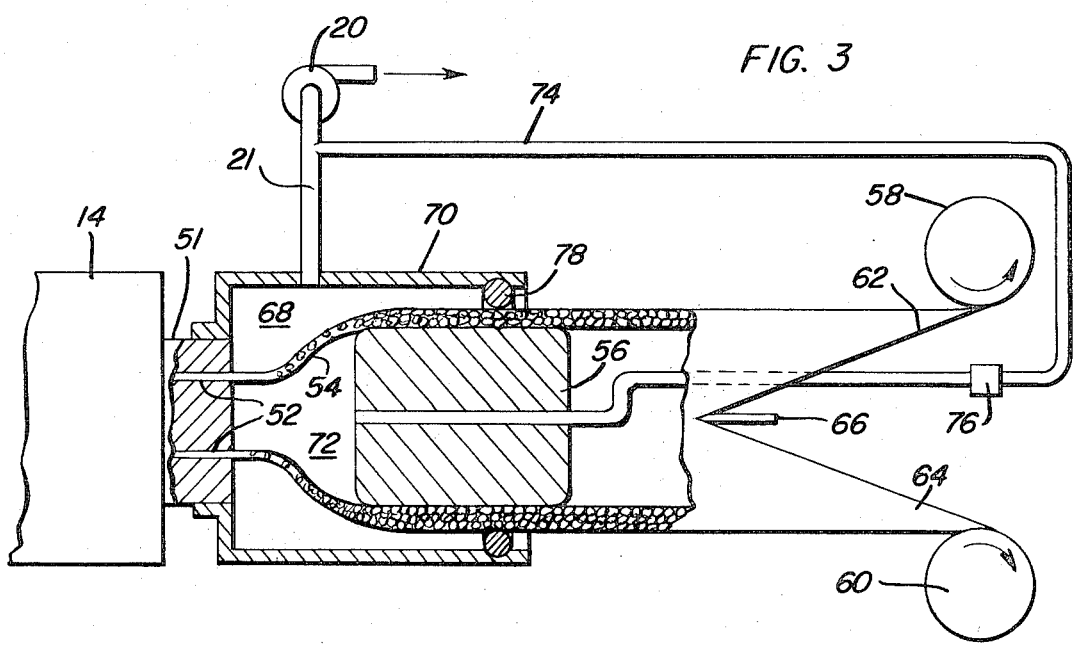
FIG. 3 is a partial side view of another embodiment of the present apparatus, partly in section, showing continuous production of a foam sheet in accordance with the present invention.

FIG. 3 illustrates embodiments of the present process and apparatus for continuously forming endless foamed polymeric sheets. Foamable theromplastic polymeric composition is melted and pressured in extruder 14 substantially as described above and continuously extruded through generally cylindrical annular orifice 52 provided in die 51. The extrudate in the form of tubular film 54 is advanced over generally cylindrical mandrel 56, while the film foams, by means of rolls 58 and 60. The rolls take up two endless foamed sheet portions 62 and 64 which may be formed from the foamed tubular film by advancing the tube against knife 66 having its cutting edge positioned along a diameter of the advancing tube. The tubular film 54 highly expands to form low density foamed cellular sheet by means of maintaining subatmospheric pressure in zone 68 of chamber 70 typically from about 20 to about 400 mm. Hg absolute. This subatmospheric pressure is maintained by applying vacuum to the zone 68 through line 21. The diameter of the foaming tubular film is increased to pass over mandrel 56 by means of a pressure differential developed across the tube wall by means of maintaining the pressure in zone 72 preferably from about 25 to about 100 mm. Hg greater than the subatmospheric pressure in zone 68. The zone 72 pressure is thus maintained by means of applying an appropriate vacuum through branch conduit 74 which is provided with regulator valve 76 for regulating the zone 72 pressure.

Chamber 70 which may be cup-shaped is sealed and secured at one end to die 50 and is provided with ring 78 in its opposite end. The ring slidably engages the foamed tubular sheet entirely about its circumference as the sheet exits the chamber through the ring, thereby sealing zone 68.

Highly expanded cellular foam polymer having substanitally uniform cell diameter may be continuously produced in accordance with the present invention. For example, polystyrene having from about 1 to about 8 percent by weight n-pentane uniformly dispersed throughout may be expanded to produce foam having bulk density as low as about 0.02 gram per cubic centimeter. Foaming agents such as butane, isopentane, trichlorofluoromethane, dichlorodifluoromethane and the like may be substituted for, or added with n-pentane.

Solid bubble-nucleating agents may be included in the thermoplastic composition being foamed. Such agents are well known and are exemplified by sodium bicarbonate-citric acid, talc and the like. While suitable bubble nucleation may occur without requiring a nucleation agent, typically such an agent is either included in the polymeric feed or added to the polymeric melt.

The thermoplastic compositions being foamed may include various other components such as fillers, stabilizers, antioxidants, flame retardants, dyes, pigments, surfactants and the like.

Practice of the present invention will be further illustrated by the following non-limiting examples.

Example 1

Polystyrene beads including about 5 weight percent pentane dispersed therein by a conventional steeping procedure were continuously fed at a rate of 5 to 10 pounds per hour into the extruder inlet of an apparatus having a subatmospheric pressure chamber associated with the discharge end substantially as illustrated in FIG. 2 of the appended drawing. The orifice through the two-inch thick die was a cylindrical hole of ⅛ inch diameter. The screw was rotated at 40 revolutions per minute. The temperature profile progressing along the barrel from the feed end to the discharge end was 370° C.–270 C.–312° C.–300° C. In the 300° C. zone, i.e., in the zone nearest the orifice, the pressure developed on the polystyrene melt was 2500 pounds per square inch. The chamber was maintained at 100 to 300 mm. Hg absolute pressure. The resulting continuously produced foam polystyrene rod was found to have average bulk density of about 0.27 grams per milliliter (g./ml.).

Foam polystyrene produced in the same apparatus using the aforesaid conditions except extruding into atmospheric pressure resulted in production of foam expanded to 0.58 g./ml.

Example 2

To the inlet of a screw extruder the discharged end of which was adapted substantially as illustrated in FIG. 3 of the appended drawing were continuously added 150 pounds per hour of commercially available polystyrene containing 0.1 percent by weight of sodium bicarbonate/ citric acid as nucleating agent. Liquid n-pentane was continuously injected into the resulting polystyrene melt at a rate of 6 to 7 pounds per hour. The orifice employed in the extruder discharge was an annular endless slot having 1.75 inch diameter and 0.028 inch gap width. The extruder screw was rotated at a rate such that the melt near the orifice was maintained at a temperature of about 275° F. and a pressure of about 400 pounds per square inch. A subatmospheric pressure of 100 mm. Hg absolute was maintained in the chamber zone external to the continuously extruded tubular polystyrene film by applying vacuum. The inside diameter of the film was increased to slightly more than 8 inches by applying vacuum to the cavity defined by the tube, the die and the end of the 8-inch diameter cylindrical mandrel facing the die. The cavity pressure was maintained at 150 mm. Hg absolute. The extruded tube was found to foam to a substantially uniform density of 0.02 grams/milliliter. The advancing foamed tube was severed substantially as illustrated in FIG. 3, the resulting sheet sections being taken up on upper and lower rolls each of which was driven at 24 feet per minute.

The lower density polymeric foams provided by the present invention have many and varied uses. The foams are especially useful in light weight insulating and packaging applications.

It is to be understood that the foregoing detailed description is given merely by way of illustration and that various modifications may be made therein without departing from the spirit or scope of the present invention.

What is claimed is:

1. A continuous process for making highly expanded cellular polystyrene foam, which comprises:
   (a) continuously feeding into a screw extruder having an outlet die ingredients including a foamable thermoplastic styrene polymer and a volatile liquid organic foaming agent having an atmospheric boiling point below the polymer melting point;
   (b) heating the feed ingredients in said extruder to form a melt;
   (c) rotating the extruder screw at sufficient speed to uniformly admix the feed ingredients and pressure the melt to sufficient pressure to maintain the melt in substantially non-foamed state; and
   (d) continuously advancing the mixed melt through said die into a zone which is maintained at a subatmospheric pressure of from about 2 to about 700 mg. Hg absolute to expand the polymer to low density cellular polymeric foam, said zone adjoining said die.

2. The process of claim 1 wherein the subatmospheric pressure in said zone is from about 2 to 400 mm. Hg absolute.

3. The process of claim 1 wherein the bulk density of the foamed polystyrene is not more than about 0.03 grams per cubic centimeter.

4. The process of claim 1 wherein the foaming agent is included in the polymer which is fed into the extruder.

5. The process of claim 1 wherein the foaming agent is added to the melted polymer in the extruder.

6. The process of claim 1 wherein the die is annular, the melt is extruded in tubular sheet form, the tube being drawn while in the subatmospheric pressure zone over at least a portion of the cylindrical surface of a generally cylindrical guide having diameter greater than the minor diameter of the annular die opening, and the pressure in the cavity defined by the tube, the die and the opposite end of the guide is from about 25 to 100 mm. Hg greater than the pressure in the subatmospheric pressure zone.

7. The process of claim 6 wherein the subatmospheric pressure external to the tube is from about 20 to about 400 mm. Hg absolute.

References Cited

UNITED STATES PATENTS

| 2,354,260 | 7/1944 | Haney et al. | 264—53 |
| 3,067,147 | 12/1962 | Rubens et al. | 264—53 |
| 3,082,144 | 3/1963 | Haley | 264—101 |
| 3,160,688 | 12/1964 | Aykanian et al. | 264—53 |
| 3,444,283 | 5/1969 | Carlson | 264—53 |
| 3,619,445 | 11/1971 | Carlson | 264—53 |
| 3,624,192 | 11/1971 | McCoy | 264—48 |
| 3,558,753 | 1/1971 | Edlin | 264—54 |

FOREIGN PATENTS

| 854,586 | 11/1960 | Great Britain | 264—DIG. 14 |

DONALD E. CZAJA, Primary Examiner

R. W. GRIFFIN, Assistant Examiner

U.S. Cl. X.R.

264—53, 54, 101; 425—4